Figure 1:
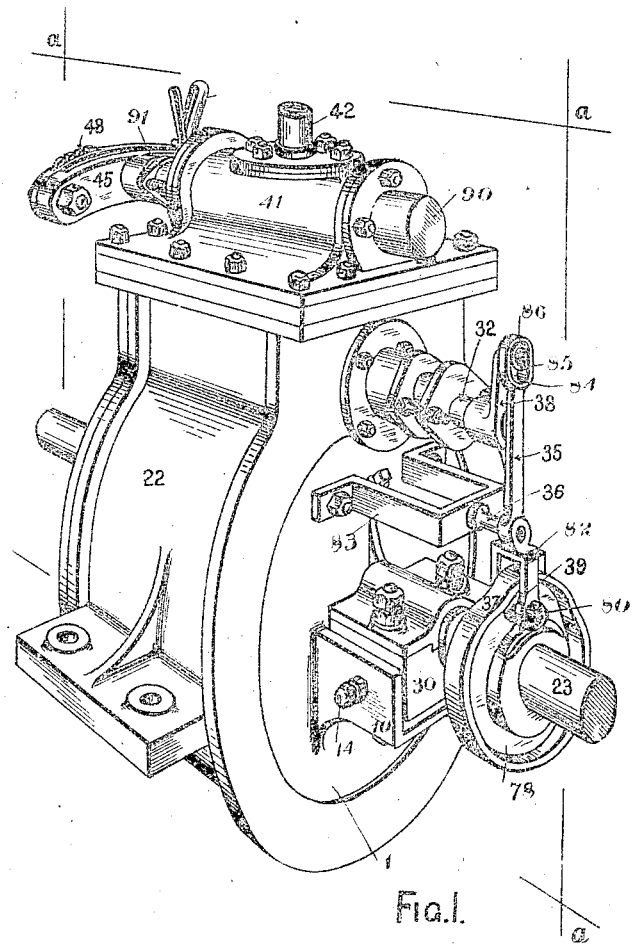

No. 854,574. PATENTED MAY 21, 1907.
J. E. FRIEND.
ROTARY ENGINE.
APPLICATION FILED JAN. 24, 1907.

7 SHEETS—SHEET 1.

Witnesses.
H. S. Trimble
Charles G. Cope

Inventor.
John E. Friend
by Chas. ———
his Attorney

No. 854,574.

PATENTED MAY 21, 1907.

J. E. FRIEND.
ROTARY ENGINE.
APPLICATION FILED JAN. 24, 1907.

7 SHEETS—SHEET 4.

Witnesses:
H. L. Trimble
Charles G. Cope

Inventor:
John E. Friend
by Chas. W. Miles
his Attorney

No. 854,574. PATENTED MAY 21, 1907
J. E. FRIEND.
ROTARY ENGINE.
APPLICATION FILED JAN. 24, 1907.

7 SHEETS—SHEET 5

Witnesses.
H. C. Trimble
Charles G. Cope.

Inventor.
John E. Friend
by Chas. H. Mackey
his attorney

No. 854,574. PATENTED MAY 21, 1907.
J. E. FRIEND.
ROTARY ENGINE.
APPLICATION FILED JAN. 24, 1907.

7 SHEETS—SHEET 6.

Witnesses.

Inventor.
John E. Friend
by Chas & Nichs
his attorney

No. 854,574.

PATENTED MAY 21, 1907.

J. E. FRIEND.
ROTARY ENGINE.
APPLICATION FILED JAN. 24, 1907.

7 SHEETS—SHEET 7.

Witnesses
H. L. Trimble.
Charles G. Cope.

Inventor
John E. Friend
by Chris N Recher
his attorney

UNITED STATES PATENT OFFICE.

JOHN EDWARD FRIEND, OF ANNANDALE, NEW SOUTH WALES, AUSTRALIA.

ROTARY ENGINE.

No. 854,574.  Specification of Letters Patent.  Patented May 21, 1907.

Application filed January 24, 1907. Serial No. 353,812.

*To all whom it may concern:*

Be it known that I, JOHN EDWARD FRIEND, a subject of the King of Great Britain, residing at Albion street, Annandale, in the State of New South Wales, in the Commonwealth of Australia, have invented certain new and useful Improvements in Rotary Engines, of which the following is a specification.

The invention relates to the class of rotary engines wherein a piston or pistons connected directly to a main shaft are rotated within an annular chamber by steam pressure.

A motor embodying my improvements comprises a circular casing having one end integrally formed and its opposite end closed by a cover. Inwardly projecting bearings integral with the end of the casing and the cover are provided for a main shaft which is further supported by bearings supported upon brackets upon the exteriors of the casing and cover. These bearings are adjustable in all directions by set screws and lock nuts in order that the shaft may be maintained truly axial with the casing. Corresponding circular walls integral with the end of the casing and with the cover project toward each other within the casing, a space being provided between the ends of said walls which is occupied by a disk fixed to the main shaft. An annular chamber or cavity is thus forced between the walls and the casing. A piston fitting and rotatable within the annular chamber is formed integrally upon the disk, and special means are provided for making the piston steam tight in the said chamber. Admission of steam to and exhaust of steam from the annular chamber is controlled by a valve working within a cylinder having steam and exhaust ports, the steam ports leading to a steam chest upon the top of the casing. This valve is oscillated by means of an eccentric mounted upon the main shaft and having a forked eccentric rod pivoted to a slotted quadrant fixed upon the spindle of the valve. A reversing handle pivoted upon the pin of the fork of the eccentric rod is slidable upon the slotted quadrant, and is provided with a spring catch adapted to engage teeth formed upon each end of the said quadrant. The engine is reversed by moving the reversing handle to one end or other of the slotted quadrant. A rocking valve is mounted upon a shaft within the steam chest referred to and has a rounded top made steam tight with the top of the steam chest by means of a packing bar. The ends of the rocking valve are likewise made steam tight with the steam chest. When the piston during its rotation has passed the top of the casing the valve is immediately rocked across the chamber so that one of its edges bears upon the top of the wall referred to, steam passing into the annular chamber between it and the piston until it is cut off by the valve referred to. Exhaust steam upon the other side of the rocking valve escapes through the valve and passing round the casing issues through an exhaust pipe at the bottom thereof. The rocking valve is operated by means of a cam provided with grooves adapted to receive rollers mounted upon the end of a lever pivoted upon a bracket secured to the end of the casing. The upper end of this lever is slotted to receive a roller mounted upon a crank pin of a crank secured to the shaft of the rocking valve. The revolution of the cam oscillates the lever as required to rotate the piston in either direction.

My invention will be better understood by reference to the drawings which form part of this specification wherein:—

Figure 2:
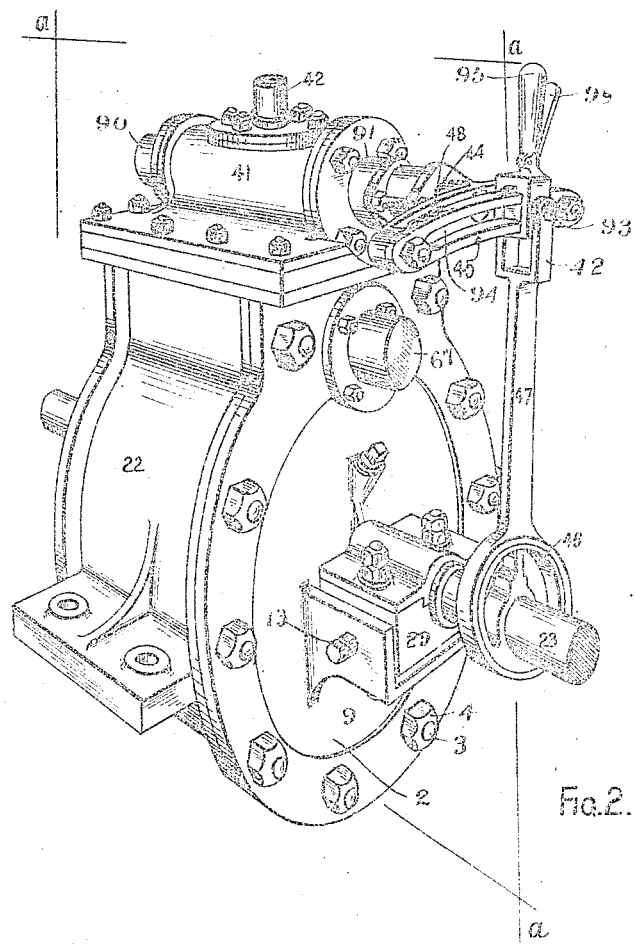
Figure 4:
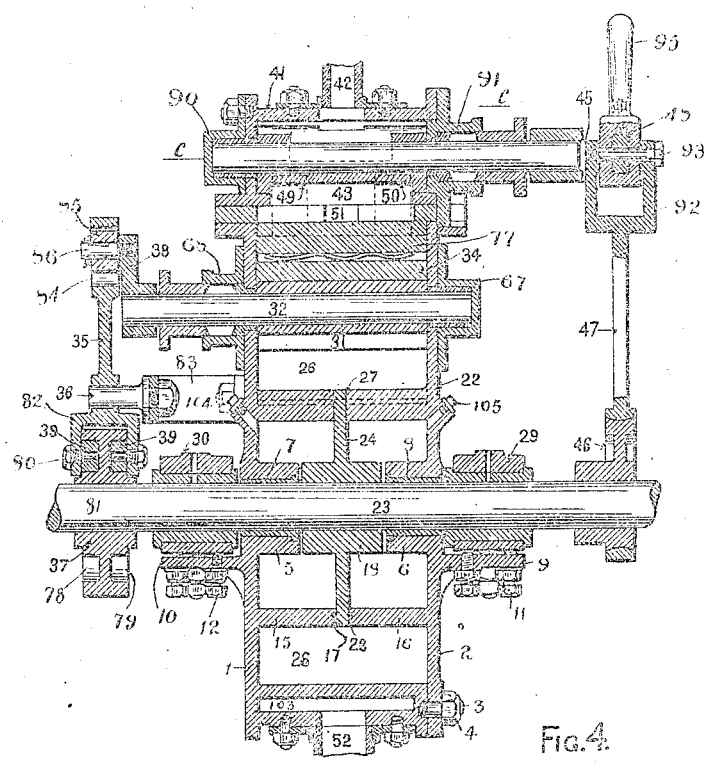
Figure 5:
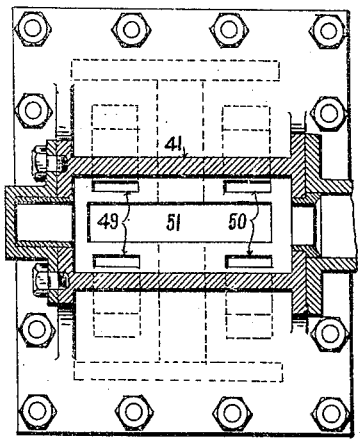
Figure 6:
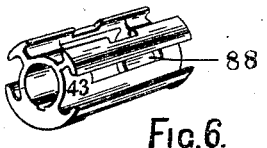
Figure 7:
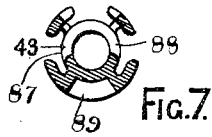
Figure 8:
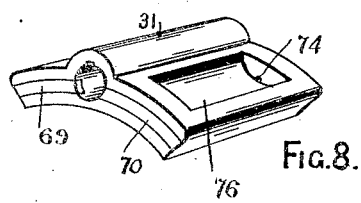
Figure 9:
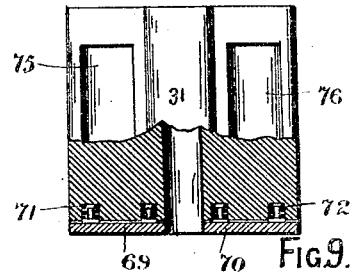
Figure 10:
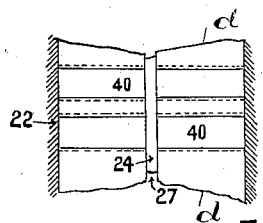
Figure 11:
Figure 12:
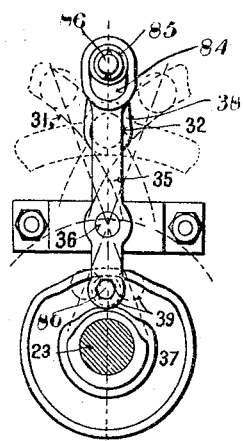
Figure 13:
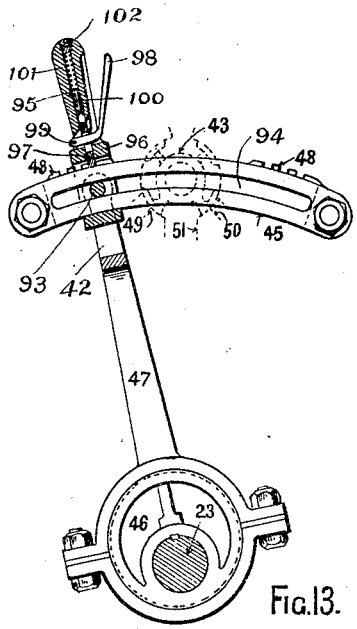
Figure 14:
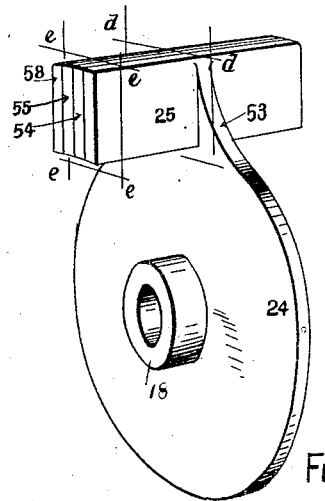
Figure 15:
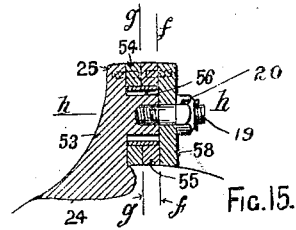
Figure 16:
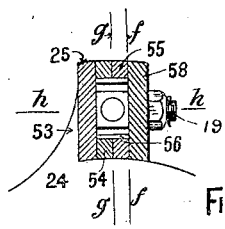
Figure 17:
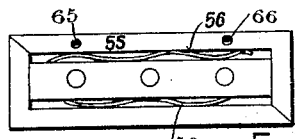
Figure 18:
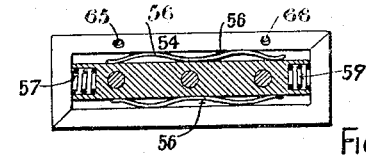
Figure 19:
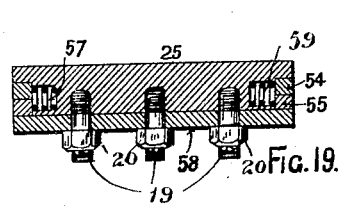
Figure 20:
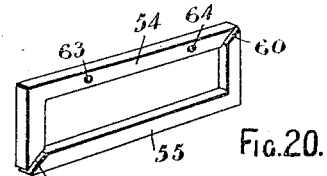
Figure 21:
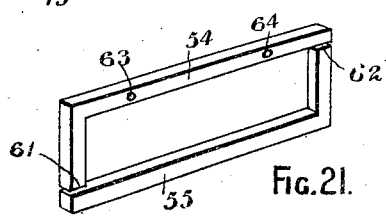

Figure 1 is a rear perspective elevation. Fig. 2 a front perspective elevation, and Fig. 3 a central cross sectional elevation. Fig. 4 is a longitudinal sectional elevation on plane $a$—$a$ of Figs. 1 and 2 and line $b$—$b$ of Fig. 3. Fig. 5 is a sectional plan of the steam chest on line $c$—$c$ of Fig. 3. Fig. 6 a perspective elevation, and Fig. 7 a cross section of the main valve. Fig. 8 a perspective elevation, and Fig. 9 a plan partly in section of the rocking valve. Fig. 10 a plan of part of the wall within the casing showing contact pieces. Fig. 11 a sectional elevation on line $d$—$d$, Fig. 10. Fig. 12 an elevation of the cam and oscillating lever for operating the rocking valve. Fig. 13 an elevation of the eccentric rod and quadrant for operating the main valve. Fig. 14 a perspective elevation of the disk and piston. Fig. 15 a section of the piston on plane $d$—$d$ of Fig. 14. Fig. 16 a section of the piston on plane $e$—$e$ of Fig. 14. Fig. 17 an elevation of the piston with cover plate removed, line $f$—$f$, Fig. 15. Fig. 18 a section of the piston on line $g$—$g$ of Fig. 16. Fig. 19 a section of the piston on line $h$—$h$ of Fig. 16. Fig. 20 a perspective elevation of a pair of packing bars, and Fig. 21 a perspective elevation of a modified form thereof.

The circular casing 22 has an integral end 1, and has its other end closed by a cover 2, secured to the casing by studs 3 and nuts 4. Bearings 5 and 6 integral with the end 1 and cover 2 respectively are provided with bushes 7 and 8 through which a main shaft 23 passes. Bearings 29 and 30 supported upon brackets 9 and 10 integral with the end 1 and cover 2 respectively are adjustable vertically by means of set screws 11 and 12, and laterally by set screws 13 and 14. The shaft is thus capable of adjustment so as to be truly axial within the casing 22.

Corresponding circular walls 15 and 16 respectively integral with the end 1 of the casing and cover 2 project toward each other, and are provided around their rims with steam packing rings 28 and 17.

A disk 24 having a boss 18 is secured upon the main shaft 23, and fits accurately between the rims of the walls 15 and 16, a steam tight joint being made between these parts by the packing rings 17 and 28. An annular chamber 26 is thus provided between the circular walls 15 and 16 and the casing 22. A piston consisting of a head 25 integral with the disk 24 and of a covering plate 58 secured to the head 25 by bolts 19 and nuts 20 has a width and height equal to the chamber 26. The piston is made steam tight within the annular chamber by means of "L" shaped packing bars 54 and 55 which have a rectangular cross section, and when arranged in pairs fit the rectangular shape of the chamber. The meeting ends of the bars 54 and 55 may be chamfered as shown at 21 and 60 in Fig. 20, or the said ends may be formed to meet as shown at 61 and 62 in Fig. 21. These packing bars are operated upon by springs 56 whereby they are made to bear against the top and bottom of the annular chamber, and by end springs 57 whereby they are made to bear against the end 1 and the cover 2 of the casing. The upper part 54 of each packing bar is provided with slotted holes 63 and 64 which fit loosely over pins 65 and 66 respectively screwed into the head 25 ( see Figs. 17, 18, 20 and 21). This arrangement permits movement of the packing bars while they are prevented from moving outwardly sufficiently to catch in the edges of the steam chest hereinafter described.

A steam chest 33 integral with the top of the casing and communicating therewith is provided with a rocking valve 31 secured upon a shaft 32 mounted in a closed end bearing 67 and stuffing box 68. The ends of this rocking valve are made as nearly as possible steam tight with the ends of the steam chest by means of packing strips 69 and 70 which are provided with springs 71 and 72. The said strips may be kept in contact with the ends of the steam chest by means of steam admitted through holes 73 and 74 to recesses 75 and 76 in the back of the valve behind the said packing strips as shown by dotted lines in Fig. 9. The top of the valve is circular and concentric with the axle 32 and a steam tight joint is made between the said top and a projection from the top of the steam chest by means of a packing strip 34 and spring 77 let into a recess formed in the bottom of said projection.

Referring now more particularly to Figs. 1, 4, 8, 9 and 12 the rocking valve 31 is operated by means of a cam 37 provided with grooves 78 and 79 and secured upon the main shaft 23. The grooves 78 and 79 consist of mutilated circles and receive friction rollers 39 pivoted upon the plain ends of set pins 80 and 81 screwed into the jaw 82 of an oscillating lever 35 which is pivoted upon a pin 36 projecting from a bracket 83 upon the end 1 of the casing. The upper end of the lever 35 has a slot 84 adapted to receive a roller 85 revolubly mounted upon the pin 86 of a crank 38 secured to the shaft 32.

Referring now more particularly to Figs. 1 to 7 and 13 the main valve 43 fits a cylindrical valve chest 41 and has steam ports 87 and 88 and an exhaust port 89. This valve is secured upon a shaft 44 mounted in a closed end bearing 90 and stuffing box 91 of the valve chest to which steam is admitted through a steam pipe 42. The valve 43 is partially rotated by an eccentric 46 secured to the main shaft 23 and having an eccentric rod 47 with a forked end 92 embracing the quadrant 45 which is secured upon the end of the shaft 44. A pin 93 passes through the forked end and through a slot 94 formed in the quadrant. The motor is reversed by means of a handle 95 having a slotted head 96 fitting upon the quadrant and through which the pin 93 passes. The head 96 is slidable upon the quadrant but is retained at either end thereof by means of a spring operated catch 97 which is retained in one or other of the notches 48 the point of "cut off" of the steam being thereby regulatable. The catch 97 is released from the teeth 48 by means of a lever 98 pivoted upon a pin 99 and passing through a slot in the catch. The handle 95 is bored to receive the upper part of the catch 97 which has a reduced part 100 upon which is located a spring 101. The spring is retained within the handle by means of a screw plug 102. Steam is admitted by the valve 43 either to the ports 49 or 50, according to the direction in which it is desired that the piston shall rotate the said ports leading from the valve chest 41 to the steam chest 33. The exhaust steam passes either through the ports 49 or 50 and is directed by the valve 43 into the exhaust port 51 whence it passes through the space 103 around the casing (which forms a steam jacket) and issues through the exhaust pipe 52 at the bottom of the casing.

Figure 3:
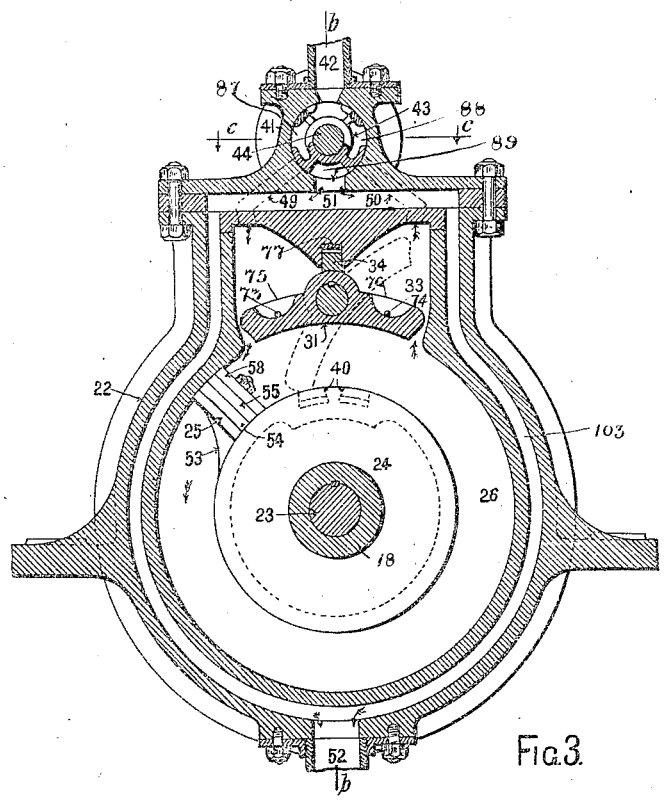

Referring now to Fig. 3. Immediately the piston, when moving in the direction shown by the arrow, has passed the rocking valve 31, the rocking valve is oscillated to the position shown by dotted lines, so that one of its edges rests upon the contact bar 40 which extends across the walls 15 and 16. Steam is then admitted through the ports 49 to the steam chest 33, and the piston is thereby impelled in the direction shown by the arrow. The exhaust steam passes at the back of the rocking valve through the ports 50 into the space 103 and through the exhaust pipe 52.

Oil is introduced into the interior of the casing by removing the screw plugs 104 and 105. The disk may revolve in an oil bath, and the parts of the engine thus be effectually lubricated.

Throughout this specification the engine is described as constructed with one piston only, but for balancing purposes a plurality of pistons may be employed, and preferably three in number arranged at equal distances apart around the circumference of the disk. Provision in that case is made for the admission of steam behind each piston during its revolution and for the exhaust thereof at the proper periods; for this purpose the grooves in the cam operating the rocking valve are made to operate the valve three times during each revolution of the main shaft, and the eccentric for operating the main steam valve is replaced by a cam which will operate said valve three times during each revolution.

Fig. 12 shows the rocking valve in three different positions by dotted lines.

The calories of the motive agent actuating the piston 25 can be employed to heat the piston chamber and maintain the operating and stationary parts at a substantially uniform temperature, by using an engine casing in which the piston chamber is surrounded by a heat chamber 103, formed between itself and the outer part 22 of the engine casing, with a valve chamber 41, provided with an inlet 42 and outlets 49 and 50, leading to the upper part of the piston chamber 26, and an outlet 51, from the valve chamber 41, into the heat chamber 103 with a valve controlling the inlets and outlets of the valve-chamber 41, whereby the motive agent can be directed from the valve chamber 41, into the piston chamber 26, and from the piston chamber 26 back to the valve chamber 41, and through the outlet 51, into the heat chamber 103 to the exhaust outlet 52.

What I claim as my invention is:—

1. A rotary engine comprising a piston chamber, a jacket inclosing the piston chamber to form an intervening space between them, a valve chamber, an inlet for the valve chamber, outlets from the valve chamber to the piston chamber, and an inlet from the valve chamber to the space between the piston chamber and jacket, a valve in the valve chamber controlling said inlet and outlets, and an exhaust outlet for the space between the jacket and piston chamber.

2. A rotary engine comprising a piston chamber, a jacket inclosing the piston chamber to form an intervening space between them, a valve chamber, an inlet for the valve chamber, outlets from the valve chamber to the piston chamber, and an outlet from the valve chamber to the space between the piston chamber and jacket, a valve in the valve chamber controlling said inlet and outlets, an exhaust outlet for the space between the jacket and piston chamber, a piston disk centrally contained within the piston chamber, a piston carried by the piston disk, and a rocking valve contained within the piston chamber.

3. A rotary engine comprising a piston chamber, a jacket inclosing the piston chamber to form an intervening space between them, a valve chamber, an inlet for the valve chamber, outlets from the valve chamber to the piston chamber, an inlet from the valve chamber to the space between the piston chamber and jacket, a valve in the valve chamber controlling said inlet and outlets, an exhaust outlet for the space between the jacket and piston chamber, and inwardly projecting annular walls for the sides of the piston chamber concentric with the center thereof, and having an unoccupied space between them.

4. A rotary engine comprising a piston chamber, a jacket inclosing the piston chamber to form an intervening space between them, a valve chamber, an inlet for the valve chamber, outlets from the valve chamber to the piston chamber, an inlet from the valve chamber to the space between the piston chamber and jacket, a valve in the valve chamber controlling said inlet and outlets, an exhaust outlet for the space between the jacket and piston chamber, inwardly projecting annular walls for the sides of the piston chamber concentric with the center thereof, having an unoccupied space between them, a shaft extending centrally through the piston chamber, a piston disk within the unoccupied space between the annular walls revoluble with said shaft, a piston carried by the piston disk and engaging the rims of said walls, and the inner face of the piston chamber.

5. A rotary engine comprising a piston chamber, a jacket inclosing the piston chamber to form an intervening space between them, a valve chamber, an inlet for the valve chamber, outlets from the valve chamber to the piston chamber, an inlet from the valve chamber to the space between the piston chamber and jacket, a valve in the valve chamber controlling said inlet and outlets, an exhaust outlet for the space between the jacket and piston chamber, inwardly projecting annular walls for the sides of the piston chamber concentric with the center thereof, having an unoccupied space between them, a shaft extending centrally through the piston chamber, a piston disk within the unoccupied space between the annular walls revoluble with said shaft, a piston carried by the piston disk engaging the rims of said walls and the inner face of the piston chamber, and a rocking valve within the piston chamber to engage with the rims of said annular walls.

6. A rotary engine comprising a piston chamber, a jacket inclosing the piston chamber to form an intervening space between them, a valve chamber, an inlet for the valve chamber, outlets from the valve chamber to the piston chamber, an inlet from the valve chamber to the space between the piston chamber and jacket, a valve in the valve chamber controlling said inlet and outlets, an exhaust outlet for the space between the jacket and piston chamber, inwardly projecting annular walls for the sides of the piston chamber concentric with the center thereof, having an unoccupied space between them, a shaft extending centrally through the piston chamber, a piston disk within the unoccupied space between the annular walls revoluble with said shaft, a piston carried by the piston disk engaging the rims of said walls and the inner faces of the piston chamber, a rocking valve, a rounded hub for the rocking valve, and means in the piston chamber engaging with said hub.

7. In a motor of the type indicated the valve operating mechanism comprising in combination a main shaft a cam secured thereto a pivoted lever, a slotted eye in the upper end of the lever, a rocking valve, a shaft to which the rocking valve is secured, a crank upon the end of the valve shaft and a roller revoluble upon the pin of the crank and fitting the slotted eye of the lever, substantially as set forth.

8. In a motor of the type indicated the operating valve with operating means comprising a circular valve chest, a valve fitting therein and having steam and exhaust ports a shaft to which the valve is secured, a main shaft an eccentric secured upon said main shaft an eccentric rod and a quadrant secured to the valve shaft, and to which the eccentric rod is pivoted, substantially as set forth.

9. In a motor of the type indicated the main operating valve and means for operating same and reversing the motor comprising a circular valve chest, a valve fitting the valve chest, a shaft to which the valve is secured, a main shaft, an eccentric secured to the main shaft, an eccentric rod, a slotted quadrant secured to the valve shaft, a jaw upon the end of the eccentric rod, a pin passing through the jaw and through the slot of the quadrant, notches upon each end of the quadrant, a handle having a slotted head slidable upon the quadrant and a spring catch upon the handle adapted to engage the notches of the quadrant, substantially as set forth.

10. A rotary motor comprising in combination a casing, corresponding walls integral with the ends of the casing and projecting toward each other therein, a main shaft mounted axially within the casing, a disk secured to the shaft and filling a space left between the rims of the walls, a piston integral with the disk and rotating within the annular chamber between the walls and the casing a rocking valve having its lower surface shaped to form an arc of a circle, a rounded top to the valve, with means for making it steam tight, a shaft to which the rocking valve is secured, a cam secured to the main shaft, a pivoted lever operated by the cam, a slotted eye upon the upper end of the lever, a main steam valve chest, a valve therein controlling admission and exhaust of steam, a shaft upon which said valve is secured, an eccentric secured to the main shaft, an eccentric rod and a quadrant secured to the valve shaft and to which the eccentric rod is pivoted, substantially as set forth.

11. A rotary motor comprising in combination, a casing, corresponding walls integral with the ends of the casing and projecting toward each other therein, a main shaft mounted axially within the casing, a disk secured to the shaft and filling a space left between the rims of the walls, a piston integral with the disk and rotating within the annular chamber between the walls and the casing, a rocking valve having its lower surface shaped to form an arc of a circle, a rounded top to the valve with means for making it steam tight, a shaft to which the rocking valve is secured, a cam secured to the main shaft, a pivoted lever operated by the cam, a slotted eye upon the upper end of the lever, a main steam valve chest, a valve therein controlling admission and exhaust of steam, a shaft upon which said valve is secured, an eccentric secured to the main shaft, an eccentric rod, and the operating and reversing means comprising a slotted quadrant secured upon the valve shaft, a jaw upon the end of the eccentric rod, a pin passing through the jaw and through the slot of the quadrant, teeth upon each end of the quadrant, a handle having a slotted head, slidable upon the quadrant, and a spring catch upon the handle adapted to engage the teeth of the quadrant, substantially as set forth.

In testimony whereof he affixes his signature in presence of two witnesses.

JOHN EDWARD FRIEND.

Witnesses:
WALTER SIGMONT,
WILLIAM NEWTON.